J. LEVEY.

VALVE.

APPLICATION FILED JAN. 17, 1911.

Reissued June 6, 1911.

13,255.

2 SHEETS—SHEET 1.

Witnesses

W. A. Williams

H. E. Klein

Inventor

John Levey.

By

Symonds, Ritter & Miles

Attorneys

J. LEVEY.

VALVE.

APPLICATION FILED JAN. 17, 1911.

Reissued June 6, 1911.

13,255.

2 SHEETS—SHEET 2.

Witnesses

W. A. Williams

K. E. Klein.

Inventor

John Levey.

By

Byrnes, Townsend, Brickenstein & Wise

Attorneys

UNITED STATES PATENT OFFICE.

JOHN LEVEY, OF CHICAGO, ILLINOIS, ASSIGNOR TO JOHN WILLIAMSON, OF CHICAGO, ILLINOIS.

VALVE.

13,255. Specification of Reissued Letters Patent. Reissued June 6, 1911.

Original No. 955,600, dated April 19, 1910, Serial No. 536,143. Application for reissue filed January 17, 1911. Serial No. 603,194.

*To all whom it may concern:*

Be it known that I, JOHN LEVEY, a citizen of the United States, residing in Chicago, county of Cook, and State of Illinois, have invented a certain new and useful Improvement in Valves, of which the following is a specification.

My invention relates to improvements in valves for use under conditions in which they are subjected to intense heat and flame, my invention relating particularly to valves employed in the gas-conducting conduits of gas-producer apparatus for controlling the passage of the gas therethrough.

My object is to provide a simple construction of valve, suitable for the purpose above referred to, which shall not be liable to impairment by the intense heat and the action of the gases to which it is subjected in use, and which will present a clear and unobstructed passage for the gases therethrough when in open condition.

Figure 1:
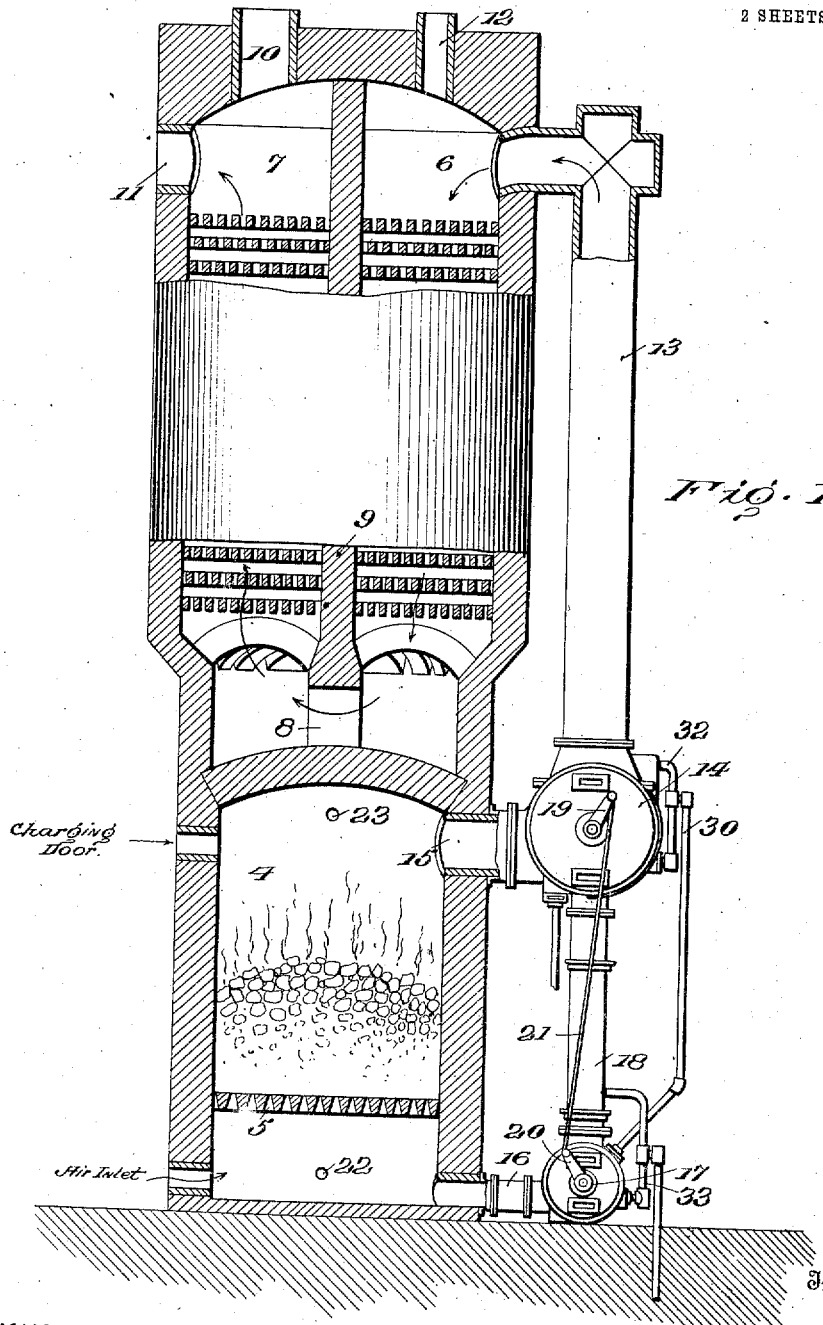
Figure 3:
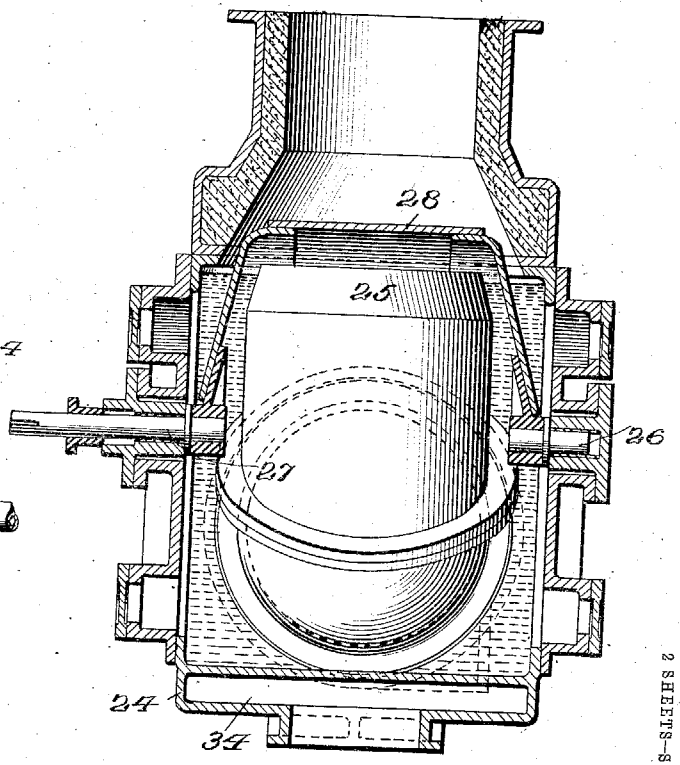
Figure 2:
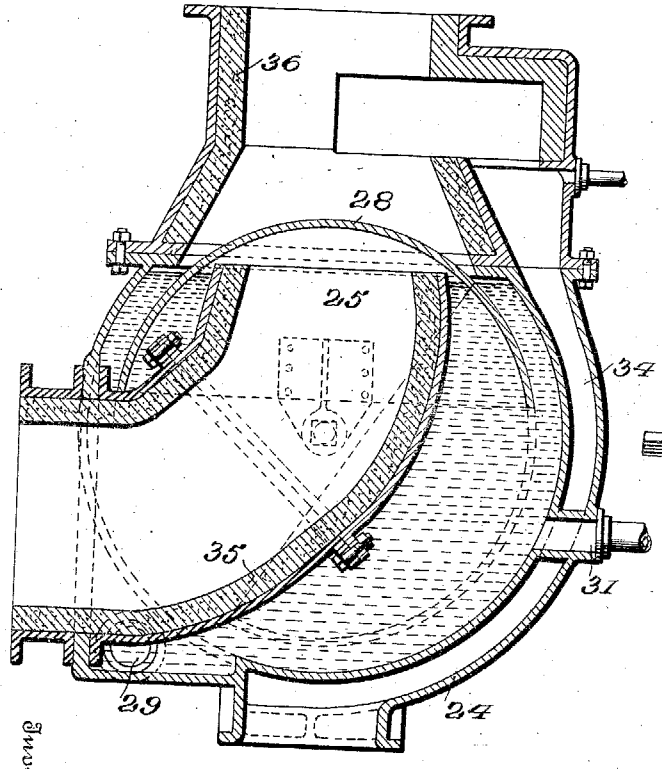

Referring to the accompanying drawings—Figure 1 shows by a view in elevation, in its greater part sectional, a gas-producer apparatus equipped with valves constructed in accordance with my invention. Fig. 2 is an enlarged view in vertical sectional elevation of the upper one of the two valves controlling the flow of gas through the producer; and Fig. 3, a similar view taken at a right-angle to that of Fig. 2.

The gas-producer apparatus for use in connection with which I have especially devised my improved valve, and in connection with which I have chosen to illustrate my invention, is of the Williamson type involving, generally stated, a generator 4 provided with a grate 5, a pair of checker-brick, vertically-disposed carbureter and superheated chambers 6 and 7, respectively, communicating with each other at their lower ends through an opening 8 in the dividing wall 9 thereof, the chamber 7 containing a flue-outlet 10 for the products of combustion passing through the chamber 7, and a gas-outlet 11; and the chamber 6 containing an inlet 12 through which the oil for mixture with the hydrogen is sprayed therein; and a system of valve-controlled conduits connecting the upper end of the chamber 6 with the interior of the generator 4 above and below the grate 5 as follows: A conduit 13 opens at its upper end into the chamber 6 and at its lower end, controlled by a valve 14, into a conduit 15 leading into the upper end of the generator 4. Communicating with the lower end of the generator 4 below the grate 5 is a conduit 16, the outer end of which, controlled by a valve 17, opens into an upright conduit 18 which is in communication at all times with the conduit 13, the valves 14 and 17 being connected together at their lever-extensions 19 and 20, respectively, by a rigid rod 21 for operating them simultaneously, their positions being such that when either one is open the other is closed and vice versa.

The apparatus in so far as it is described, is of common and well-known construction, and as it operates in a well-known manner, description thereof in detail is unnecessary. It may be stated, however, that after the steam introduced into the generator 4 below the grate 5 at the point indicated at 22 has passed upwardly for a few minutes through the incandescent coke-bed and thence through the conduits 13 and 14 and chambers 6 and 7, the fire becomes deadened, especially at the bottom, and it is necessary to reverse the flow of steam therethrough, this being done by operating the valves 14 and 17 to open valve 17 and close valve 14 and thereupon introducing steam into the generator above the grate 5 as at 23, the course of the steam and gas then being downward through the coke-bed and thence through conduits 16, 18 and 13 and chambers 6 and 7 to the gas-outlet 11. When the generator is fired, the valve 14 is subjected to tremendous heat, and when the steam is introduced into the generator in the up and down runs, viz. when the steam ascends and descends through the coke-bed both valves 14 and 17 are subjected to extreme heat and, furthermore, to the action of the gases, and it is to avoid impairment to the valves in these conduits from the action of heat and gases that I have especially devised my improved valve, of which the following is a description:

The valve 14 is formed of a water-tight casing 24 communicating with and secured to the adjacent ends of the conduits 13 and 15. This casing is of general spherical shape and through its wall the upwardly-turned vertically-disposed nozzle 25 formed on the outer end of the conduit 15, extends, as represented in Fig. 2. Journaled in opposed walls of the casing and extending inwardly therefrom are stub-shafts 26 and 27, the latter being connected with the lever 19. Located in the casing and rigidly secured to the inner ends of the shafts 26 and 27 at its lower edge-portion is a hood 28 of semi-circular shape in longitudinal cross-section, this hood being designed to be swung upon its trunnions into and out of a position in which it extends over the open end of the nozzle 25. The casing 24 affords a receptacle for water which, in the construction illustrated, enters it at 29 and overflows therefrom through a pipe 30 communicating with the casing at 31, it being preferred that the flow of cold water through the casing be continuous. The location of the upper end of the pipe 30, which is connected with the conduit 13 through a pipe 32 for equalizing the pressure on the water, determines the level of the water in the casing, which may be varied as desired, it being necessary, however, that the water level be maintained at a point intermediate the top of the nozzle 25 and the lower marginal portion of the hood 28 when in the position represented in Fig. 2 for closing the valve. In other words, the hood must be submerged at its lower end in the water when in the position referred to and the upper end of the nozzle must be above the level of the water, thereby forming a water-seal valve capable of being opened by merely swinging the hood upon its journals to a position in which it is submerged in the water for uncovering the top of the nozzle, as indicated in dotted lines in Fig. 2.

The valve 17 is constructed as described of valve 14, this valve receiving its supply of water for producing the seal, in the apparatus illustrated, from the valve 14 through the pipe 30, its overflow pipe being represented at 33.

As a convenient and economical way of by-passing the gas from conduit 18 to conduit 13, when the apparatus is on a down-run, I form on the outer surface of the casing 24 of the valve 14 a passage 34 which communicates at its lower end with the upper end of the conduit 18 and at its upper end opens into the conduit 13, thus affording a continuous passage between the conduits 18 and 13.

To prevent the nozzle 25 and conduit 13 from burning out, I prefer to line them, as indicated at 35 and 36, with any suitable refractory material, such as fire-brick.

It will be manifest that by constructing a valve in accordance with my invention, the joint instead of being formed of contacting metal parts which under the action of the heat and gases to which it is subjected in use would disintegrate and burn out, is formed with a water-seal which insures the making of a satisfactory joint when the valve is closed, and is not subject to impairment by continued use. Furthermore, by providing the water-seal joint, the nozzle is constantly submerged in water and the hood partially submerged at all times and completely submerged during the periods in which the valve is open, which results in cooling these exposed parts of the valve. It will also be noted that when the valve is open, namely, when the hood is swung to the position represented in dotted lines in Fig. 2, the passage from one conduit to the other is devoid of obstructions or impediments to the free passage of the gas therethrough.

What I claim as new, and desire to secure by Letters Patent, is—

1. The combination with communicating conduits, of a valve therefor comprising, in combination, a water-chamber into which the outlet of one of said conduits extends above the water therein, and a movable hood in said chamber adapted, when in one position, to cover said conduit-outlet and extend into the water in said chamber for forming a water-seal, and to be moved from such position to uncover said outlet and extend in a position in which it will be removed from the deleterious action of the currents through said conduits.

2. The combination with communicating conduits, of a valve therefor comprising, in combination, a water-chamber into which the outlet of one of said conduits extends above the water therein, and a movable hood in said chamber adapted, when in one position, to cover said conduit-outlet and extend into the water in said chamber to form a water-seal, and to be moved from such position to uncover said outlet and be submerged in the water, for the purpose set forth.

3. The combination with communicating conduits, of a valve therefor comprising, in combination, a water-chamber into which the outlet of one of said conduits extends above the water therein, and a hood pivotally supported in said chamber and adapted, when in one position, to cover said conduit-outlet and extend into the water in said chamber for forming a water-seal, and to be moved from such position to uncover said outlet and be submerged in the water, for the purpose set forth.

4. The combination with communicating conduits, of a valve therefor comprising, in combination, a water-chamber into which the outlet of one of said conduits extends above the water therein, and a hood of curved contour pivotally supported in said chamber and adapted, when in one position, to cover said conduit-outlet and extend into the water in said chamber for forming a water-seal, and to be moved from such position to uncover said outlet and be submerged in the water, for the purpose set forth.

5. The combination with communicating conduits, of a valve therefor comprising, in combination, a water-chamber surrounding the outlet of one of said conduits, the latter extending above the water in said chamber, and a movable hood in said chamber adapted, when in one position, to cover said conduit-outlet and extend into the water in said chamber for forming a water-seal and to be moved from such position to uncover said outlet and be submerged in the water, for the purpose set forth.

6. The combination with communicating conduits, of a valve therefor comprising, in combination, a water-chamber into which the outlet of one of said conduits extends above the water therein, a movable hood in said chamber adapted, when in one position, to cover said conduit-outlet and extend into the water in said chamber for forming a water-seal and to be moved from such position to uncover said outlet and be submerged in the water, and means for circulating water through said chamber.

7. The combination with communicating conduits, of a valve therefor comprising, in combination, a water-chamber into which the outlet of one of said conduits extends above the water therein, a movable hood in said chamber adapted, when in one position, to cover said conduit-outlet and extend into the water in said chamber for forming a water-seal and to be moved from such position to uncover said outlet and be submerged in the water, means for circulating water through said chamber, said chamber containing a water-inlet and outlet, and an overflow pipe connected with the outlet and connected with the conduit above the water in said chamber, for the purpose set forth.

8. A valve comprising, in combination, a casing forming a receptacle for water, the inlet-conduit of said valve extending into said casing above the water therein, and a movable hood in said casing adapted, when in one position, to cover said conduit-inlet and extend into the water in said casing for forming a water-seal and to be moved from such position to uncover said inlet and be submerged in the water, said casing being provided with a by-pass, for the purpose set forth.

9. A valve comprising, in combination, a casing forming a receptacle for water, the inlet-conduit of said valve extending into said casing above the water therein, and a movable hood in said casing adapted, when in one position, to cover said conduit-inlet and extend into the water in said casing for forming a water-seal and to be moved from such position to uncover said inlet and be submerged in the water, said casing being provided with a passage open near the lower end of the casing and communicating with the inlet-conduit of the valve above the water therein, for the purpose set forth.

10. A valve comprising, in combination, a casing affording a receptacle for water and formed with an inlet-conduit extending into the interior of the casing with its upper end above the water therein, and a movable hood in said casing adapted, when in one position, to cover said conduit-inlet and extend into the water in said casing for forming a water-seal and to be moved from such position to uncover said inlet and be submerged in the water, for the purpose set forth.

11. A valve comprising, in combination, a casing having a receptacle for water, the inlet conduit of said valve extending through a side thereof and terminating above the water in said casing, and a hood pivotally supported in said casing adapted, when in one position, to cover said inlet and extend into the water in said casing for forming a water-seal, and to be moved from such position to a position in which said inlet is uncovered and the hood is submerged in the water.

12. In a valve-device of the character described, the combination of communicating conduits, a valve for said conduits comprising a water-chamber into which the outlet-end of one conduit extends above the water therein, and a hood in, and movable within, said chamber to a position in which it covers said conduit-outlet and extends into the water in said chamber to form a water-seal and into the other position to uncover said outlet and be removed from the deleterious action of the currents through the conduits.

13. In a valve-device of the character described, the combination of communicating conduits, a valve for said conduits comprising a water-chamber into which the outlet-end of one conduit extends above the water therein, a hood in, and movable within, said chamber to a position in which it covers said conduit-outlet and extends into the water in said chamber to form a water-seal and into the other position to uncover said outlet and be removed from the deleterious action of the currents through the conduits, and means external of the casing for moving said hood from one position to the other.

14. In a valve-device of the character described, the combination of communicating conduits, a valve for said conduits comprising a water-chamber into which the outlet-end of one conduit extends above the water therein, and a hood in, and movable within, said chamber to a position in which it covers said conduit-outlet and extends into the water in said chamber to form a water-seal and into the other position to uncover said outlet and be submerged in the water in said chamber, for the purpose set forth.

15. In a valve-device of the character described, the combination of communicating conduits, a valve for said conduits comprising a water-chamber into which the outlet-end of one conduit extends above the water therein, a hood in, and movable within, said chamber to a position in which it covers said conduit-outlet and extends into the water in said chamber to form a water-seal and into the other position to uncover said outlet and be submerged in the water in said chamber, and means external of said chamber for moving said hood from one position to the other.

16. In a valve-device of the character described, the combination of communicating conduits, a valve for said conduits comprising a water-chamber into which the outlet-end of one conduit extends above the water therein, and a hood pivotally supported in, and movable within, said chamber to a position in which it covers said conduit-outlet and extends into the water in said chamber to form a water-seal and into the other position to uncover said outlet and be submerged in the water in said chamber, for the purpose set forth.

17. In a valve-device of the character described, the combination of communicating conduits, a valve for said conduits comprising a water-chamber into which the outlet-end of one conduit extends above the water therein, and a hood of curved contour pivotally supported in, and movable within, said chamber to a position in which it covers said conduit-outlet and extends into the water in said chamber to form a water-seal and into the other position to uncover said outlet and be submerged in the water in said chamber, for the purpose set forth.

18. In a valve-device of the character described, the combination of communicating conduits, a valve for said conduits comprising a water-chamber surrounding the outlet-end of one conduit, the latter extending above the water in said chamber, and a hood in, and movable within, said chamber to a position in which it covers said conduit-outlet and extends into the water in said chamber to form a water-seal and into the other position to uncover said outlet and be submerged in the water in said chamber, for the purpose set forth.

19. In a valve-device of the character described, the combination of communicating conduits, a valve for said conduits comprising a water-chamber into which the outlet-end of one conduit extends above the water therein, a hood in, and movable within, said chamber to a position in which it covers said conduit-outlet and extends into the water in said chamber to form a water-seal and into the other position to uncover said outlet and be submerged in the water in said chamber, and means for circulating water through said chamber.

20. In a valve-device of the character described, the combination of communicating conduits, a valve for said conduits comprising a water-chamber into which the outlet-end of one conduit extends above the water therein, a hood in, and movable within, said chamber to a position in which it covers said conduit-outlet and extends into the water in said chamber to form a water-seal and into the other position to uncover said outlet and be submerged in the water in said chamber, means for circulating water through said chamber, said chamber containing a water-inlet and outlet, and an overflow-pipe connected with the outlet and connected with the conduit above the water in said chamber, for the purpose set forth.

21. In a valve-device of the character described, the combination of communicating conduits, a valve for said conduits comprising a casing formed with a receptacle for water into which the outlet end of one conduit extends above the water therein, and a hood in, and movable within, said chamber to a position in which it covers said conduit-outlet and extends into the water in said chamber to form a water-seal and into the other position to uncover said outlet and be submerged in the water in said chamber, said casing being provided with a by-pass.

22. In a valve-device of the character described, the combination of communicating conduits, a valve for said conduits comprising a casing formed with a receptacle for water into which the outlet-end of one conduit extends above the water therein, and a hood in, and movable within, said chamber to a position in which it covers said conduit-outlet and extends into the water in said chamber to form a water-seal and into the other position to uncover said outlet and be submerged in the water in said chamber, said casing being provided with a passage open near the lower end of the casing and communicating with said outlet above the water in the chamber, for the purpose set forth.

23. In a valve-device of the character described, the combination of communicating conduits, a valve for said conduits comprising a casing formed with a receptacle for water, one of said conduits extending into said casing through a side thereof and terminating above the water in said chamber, and a hood pivotally supported in, and movable within, said chamber to a position in which it covers said conduit-outlet and extends into the water in said chamber to form a water-seal and into the other position to uncover said outlet and be submerged in the water in said chamber, for the purpose set forth.

JOHN LEVEY.

In presence of—
L. B. Baker,
K. E. Klein.